UNITED STATES PATENT OFFICE.

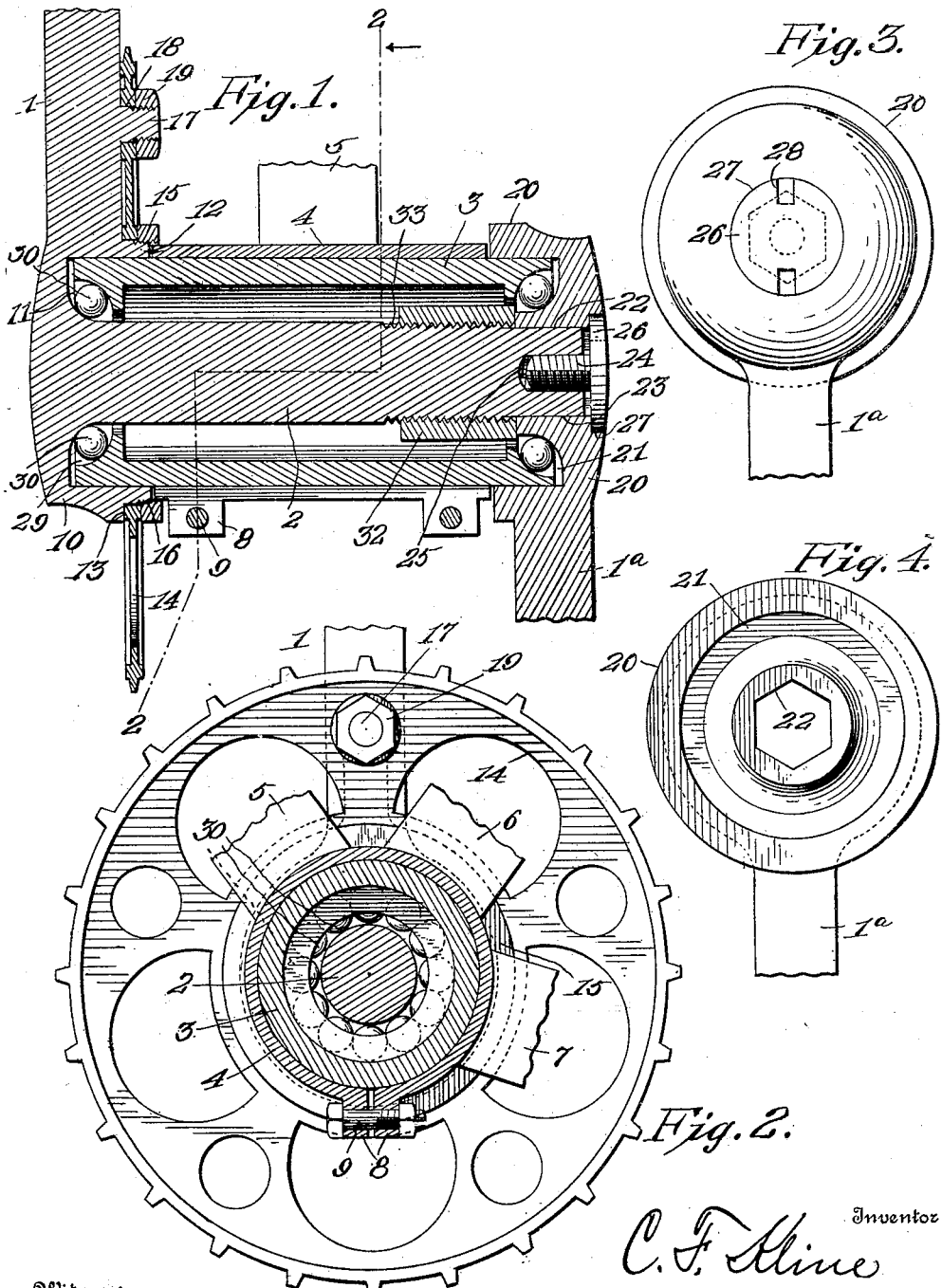
C. F. KLINE.
BICYCLE CRANK HANGER.
APPLICATION FILED NOV. 27, 1908.
920,583.
Patented May 4, 1909.

CLARENCE F. KLINE, OF KUTZTOWN, PENNSYLVANIA.

BICYCLE CRANK-HANGER.

No. 920,583.          Specification of Letters Patent.          Patented May 4, 1909.

Application filed November 27, 1908. Serial No. 464,704.

*To all whom it may concern:*

Be it known that I, CLARENCE F. KLINE, a citizen of the United States, residing at Kutztown, in the county of Berks and State of Pennsylvania, have invented certain new and useful Improvements in Bicycle Crank-Hangers, of which the following is a specification, reference being had to the accompanying drawings.

This invention relates to improvements in bicycles and more particularly crank hangers therefor.

The object of the invention is to provide a simple and practical device of this character composed of few parts which are strong and durable, and which may be produced at a small cost and readily assembled and adjusted.

With the above and other objects in view, the invention consists of the novel features of construction and the combination and arrangement of parts hereinafter fully described and claimed, and illustrated in the accompanying drawings, in which—

Figure 1 is a vertical longitudinal sectional view through the invention; Fig. 2 is a vertical cross section on the line 2—2 in Fig. 1; Fig. 3 is a detail end view; and Fig. 4 is an inner face view of one of the cranks.

In the drawings 1, 1ᵃ denote the two cranks which are rigidly connected to each other through a shaft 2 formed integral with the crank 1 and arranged for rotation in a cylindrical bearing member or barrel 3 secured to the bicycle frame 4. The portion of the bicycle frame in which the bearing barrel cylinder 3 is removably secured is in the form of a split clamping sleeve or hanger, from the upper portion of which radiate the several bars 5, 6, 7 of the usual diamond-shaped bicycle frame. The bottom portion of the clamping sleeve or hanger 4 of the frame is split longitudinally and the split portion is formed with pairs of opposing ears 8 apertured to receive clamping bolts or the like 9. It will be seen upon reference to Fig. 2 that when the bolts 9 are tightened the hanger 4 will tightly bind the bearing barrel or cylinder 3 and rigidly unite the same to the bicycle frame.

The crank 1 has its inner end formed with a circular enlargement 10 containing on its inner face an annular cavity or recess 11 surrounding the integral shaft 2. Said enlargement 10 also forms upon the inner face of said end of the crank 1 an annular flange 12, the exterior of which is reduced to provide an annular shoulder 13 against which fits the sprocket wheel 14. The latter is clamped on the shoulder 13 by a ring nut 15 engaged with screw threads 16 cut in the outer portion of the flange 12 and said sprocket wheel is prevented from rotating with respect to the crank 1 by the engagement of a stud 17 with an opening 18 in the outer portion of said sprocket wheel. Said stud 17 is formed integral with the crank 1 on its inner face and its projecting extremity is screw threaded to receive a clamping nut 19 which assists the nut 15 in securing the sprocket wheel to said crank. The other crank 1ᵃ is formed at its inner end with a similar circular enlargement 20, the inner face of which is formed with an annular cavity or recess 21 surrounding a central opening or bore 22 formed in said enlargement 20. Said opening or bore 22 is hexagonal in cross section or of any other polygonal shape so that it has flat faces to receive the flat faced or similar-shaped end 23 of the shaft 2 and thereby lock the crank 1ᵃ to rotate with the shaft 2 and the crank 1. The crank 1ᵃ is retained upon the shaft 2, preferably, by means of a screw 24 engaged with a threaded socket 25 formed centrally in the outer extremity of the shaft 2, as shown in Fig. 1. Said screw 24 has a large circular head 26 adapted to fit in a similar-shaped recess 27 formed in the outer face of the enlargement 20 of the crank 1ᵃ, and the outer face of said head 26 is formed at opposite points with seats 28 to receive the studs of a spanner wrench by means of which the screw 24 may be removed.

The bearing cylinder or barrel 3 has its exterior of uniform diameter so that when the bolts 9 of the hanger 4 are loosened it may be readily slipped into or out of said hanger, and its ends are shaped to provide annular raceways 29 for annular rows of bearing balls 30 provided in the cavities 11, 21 of the cranks 1, 1ᵃ. These bearings may be adjusted to compensate for wear and to obtain an effective working fit by adjusting a nut 32 upon external screw threads 33 formed on the shaft 2 adjacent to its flat faced end 22, said nut 32 forming an adjustable stop which is engaged by the crank 1 when the latter is applied to the shaft 2 and which limits the inward movement of said crank on said shaft.

From the foregoing it will be seen that the invention provides an exceedingly simple device of this character which is composed of few strong and durable parts that may be produced at a small cost and readily assembled and adjusted. It is not only comparatively inexpensive in construction but exceedingly strong and durable in use and also attractive in appearance.

Having thus described the invention what is claimed is:

1. The combination of a bearing barrel, a crank, a shaft carried by said crank and projecting through said barrel, said shaft having a flat faced extremity and a screw threaded portion, a nut upon the latter, a second crank having an opening to receive said flat faced extremity of the shaft, the inward movement of the second crank upon the shaft being limited by said nut, anti-friction bearings between the shaft and its crank and said barrel, and means for retaining the second crank upon the shaft.

2. The combination of a split clamping hub of a bicycle frame, bolts for tightening said hub, a bearing barrel arranged in said hub and provided at its ends with raceways, a crank recessed at one end to receive one end of the barrel, an annular row of bearing balls in said recess and the raceway at the adjacent end of the barrel, a shaft formed integral with said crank and having a flat faced extremity, a screw threaded portion and a screw threaded socket, a second crank having an opening to receive the flat faced extremity of the shaft and also having an annular recess, an annular row of bearing balls in the latter and the raceway at the adjacent end of the barrel, a nut upon the threaded portion of the shaft to limit the inward sliding movement of the second crank on the shaft, and a headed screw for retaining the second crank upon the shaft and engaged with the threaded socket in the latter.

In testimony whereof I hereunto affix my signature in the presence of two witnesses.

CLARENCE F. KLINE.

Witnesses:
ELMER L. DIETRICH,
HARRY W. KLINE.